March 28, 1944.   O. C. MARTIN   2,345,349
METHOD OF REAMING VALVE SEATS
Original Filed April 20, 1940
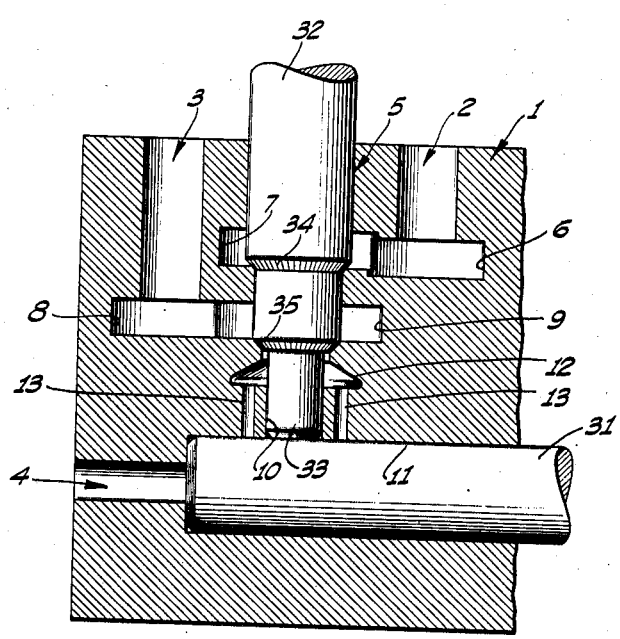
OTIS C. MARTIN,
INVENTOR.
BY
ATTORNEY.

Patented Mar. 28, 1944

2,345,349

UNITED STATES PATENT OFFICE 2,345,349

METHOD OF REAMING VALVE SEATS

Otis C. Martin, Los Angeles, Calif.

Original application April 20, 1940, Serial No. 330,752. Divided and this application March 16, 1942, Serial No. 434,813

4 Claims. (Cl. 90—12.5)

My invention relates to a method of making valves and has particular reference to a method of reaming valve seats in a valve body in such manner as to properly locate a plurality of valve seats in a predetermined spaced relation to each other and in a predetermined spaced relation to the operating surfaces of the operating member employed to actuate the valves associated with such seats.

This application is a division of my copending application Serial No. 330,752, filed April 20, 1940, and entitled Method and apparatus for manufacturing valve bodies.

In my Patent No. 2,279,693, issued April 14, 1942, entitled Valve, I have described and claimed a novel fluid valve construction which is particularly adapted for use in aircraft for controlling various types of fluid power apparatus. The particularly notable advantages inherent in this new valve reside in its small size, light weight and inexpensive construction. The present invention is directed to certain methods of valve manufacture by means of which this new valve may be readily and inexpensively constructed and to certain tools which may be used in the practice of the method.

Valves of the character disclosed in my aforementioned Patent No. 2,279,693 employ a plurality of bores and chambers, a part of which are used to house valve members and a part of which constitute fluid entrance and exit openings. These bores and chambers are provided with various enlargements which function as fluid passages, and certain of these are disposed in intersecting relation with enlargements of adjacent bores to provide a fluid intercommunication between bores. Prior to my invention these bores and enlargements had to be formed of destructible cores employed in connection with the casting of cast valve bodies or, in the case of valves requiring a valve body of greater strength and higher quality than could be obtained by casting, by means of boring tools requiring the use of a separate tool for each bore and enlargement thereof and frequently requiring a separate and distinct "set up" of the boring machine for each operation. Such methods of manufacture are expensive and time consuming.

In the valve construction disclosed in my aforementioned Patent No. 2,279,693, a plurality of valve members are mounted in a chamber and moved into and out of engagement with seats formed in the chamber by means of a cam shaft rotatably mounted in a bore intersecting the chamber. In such a construction it is important that the valve seats be accurately located relative to the cam shaft. Prior to my invention this relation was obtained by locating the cam shaft bore and the valve seats a predetermined distance from some reference plane, such as the top of the valve body. As is well known, bores are apt to drift or creep when being drilled so that such a method of locating the valve seats is not dependable and irregularities in construction are caused thereby.

It is accordingly an additional object of my invention to provide the method of locating valve seats relative to a cam shaft bore which consists in reaming the seats to move them toward the cam shaft bore and continuing such reaming until the seat is moved to a position a predetermined distance from the cam shaft bore.

It is a still further object of my invention to provide a method of locating valve seats relative to a cam shaft bore which consists in placing a dummy cam shaft in the cam shaft bore, interposing a stop of predetermined length between a valve seat reamer and said dummy cam shaft, and reaming said valve seat toward said bore until said stop prevents further reaming.

Other objects and advantages of my invention will be apparent from a study of the following specification, read in connection with the accompanying drawing, wherein The figure is a fragmentary sectional view through a valve body and illustrating the manner in which the method of my invention may be practiced to accurately locate valve seats with respect to a transversely extending bore employed to support and guide a valve actuating cam shaft.

I have illustrated in the accompanying drawing the method of my invention as practiced in the forming of a valve such as that disclosed and claimed in my aforementioned Patent No. 2,279,693. The valve which is disclosed in that application employs a valve body 1, within which is provided an inlet port 2, a discharge port 3, an exhaust port 4, and a valve chamber bore 5. The inlet port 2 is provided at its lower end with an enlargement 6 thereof which intersects an upper enlargement 7 formed within the valve chamber bore 5. Similarly the discharge bore 3 is provided at its lower end with an enlargement 8 which intersects a similarly disposed enlargement 9 formed in the valve chamber bore 5.

The valve chamber bore 5 is provided with a guiding bore 10 formed as a smaller diameter extension of the chamber 5, which guiding bore intersects a laterally extending cam shaft bore 11 which is in turn formed as an enlarged diameter continuation of the exhaust port 4. The guiding bore 10 is employed in the valve disclosed in my aforementioned copending application as a guide for receiving a valve stem and a fluid passage around this portion of the bore 10 is obtained by providing a third enlargement 12 of the valve chamber 5 which may be intersected by means of a plurality of smaller bores 13 extending between the cam shaft bore 11 and the enlargement 12.

The valve stem which is received within the guiding bore 10 carries an upper valve member which is adapted to close off the bore 5 between the enlargements 7 and 9 and a lower valve member adapted to close off the bore 5 between the enlargements 9 and 12, these valve members being arranged on the valve stem in such manner as to be selectively actuated by a cam which is rotatably mounted within the cam shaft bore 11. This mechanism is so arranged that when the cam shaft is moved to one position, the upper valve member is lifted to provide a fluid intercommunication between the inlet port 2 and the discharge port 3 by way of the enlargements 6, 7, 8 and 9. The cam shaft is also arranged in such manner that when moved to another position, the lower valve member is raised, providing for the interconnection of the discharge port 3 with the exhaust port 4 by way of the enlargements 8, 9, 12 and the auxiliary bores 13.

The valve members which are employed in the valve which is disclosed in my aforementioned copending application are adapted to engage seats formed on the upper ends of the constricted portions lying between the enlargements 7 and 9 and between the enlargements 9 and 12, respectively. These valve seats should be accurately positioned vertically with respect to the cam shaft bore 11 in order to insure proper cooperation between these valve members and the cam shaft which is received within the bore 11.

I have devised a novel method of obtaining the proper accurate disposition of these valve seats, which consists in inserting within the cam shaft bore 11 a dummy cam shaft 31 which preferably comprises a cylindrical member as shown in the figure and employing a valve seat reamer 32 which carries on its lower end a stop 33 adapted to engage the dummy cam shaft 31 when reamer portions 34 and 35 thereof are disposed the proper distances from the cam shaft bore 11. The reaming tool 32 is inserted in the bore 5 and the reaming of the valve seats is begun. As this reaming operation continues, the valve seats are gradually lowered until such time as the stop member 33 comes into contact with the dummy cam shaft 31 to prevent further downward movement of the reaming tool. In order to prevent inaccuracies resulting from wear of the stop member and the dummy cam shaft 31, these members are preferably of hardened material capable of withstanding the pressure and wear to which they would be subjected in quantity production methods.

It will be observed that by this means the valve seats are accurately positioned relative to the cam shaft bore 11, a condition which cannot be achieved by locating the valve seats from some reference plane such as the top of the valve block 1 and attempting to locate the cam shaft bore 11 relative to this same surface for the reason that in the drilling of the cam shaft bore 11, the drill will creep a slight amount so as to cause an improper positioning of the valve seats relative to the bore.

While I have shown and described the preferred embodiment of my invention, I do not desire to be limited to any of the details of construction shown or described herein, except as defined in the appended claims.

I claim:

1. The method of forming in a valve chamber bore a valve seat in a precisely predetermined location relative to a cam shaft bore intersecting said chamber bore which consists in placing a cylindrical dummy cam shaft in said cam shaft bore, placing a reamer in said chamber bore and reaming to move said seat toward said cam shaft bore, and interposing a stop member of predetermined length between said dummy cam shaft and said reamer to stop said reaming when said seat has been moved to said predetermined location.

2. The method of forming in a valve chamber bore a pair of valve seats in precisely predetermined locations relative to each other and relative to a cam shaft bore intersecting said chamber bore which consists in placing a cylindrical dummy cam shaft in said cam shaft bore, placing a tandem reamer in said chamber bore and reaming to move said seats toward said cam shaft bore, and interposing a stop member of predetermined length between said dummy cam shaft and said reamer to stop said reaming when said seats have been moved to said predetermined locations.

3. The method of forming in a valve chamber bore a pair of valve seats in precisely predetermined locations relative to each other and relative to a cam shaft bore intersecting said chamber bore which consists in placing a cylindrical dummy cam shaft in said cam shaft bore, placing in said chamber bore a reamer having a pair of reaming elements spaced from each other in accordance with the spacing of said predetermined locations of said valve seats relative to each other and reaming to move said seats toward said cam shaft bore, and interposing a stop member of predetermined length between said dummy cam shaft and said reamer to stop said reaming when said seats have been moved to said predetermined locations.

4. The method of forming in a valve chamber bore a valve seat in a precisely predetermined location relative to a cam shaft bore intersecting said chamber bore which consists in reaming said seat by means of a reamer carrying a leading pilot portion having a length equal to the distance separating said predetermined location from the nearest portion of said cam shaft bore, and placing a cylindrical dummy cam shaft in said cam shaft bore to be engaged by said pilot portion and arrest said reaming.

OTIS C. MARTIN.